United States Patent
Wolinsky et al.

(10) Patent No.: US 7,272,424 B2
(45) Date of Patent: Sep. 18, 2007

(54) GAMETENNA, INTERFACING WIRELESS TELEPHONE AND METHOD

(76) Inventors: Robert S. Wolinsky, 10 Connemara Ct., Sewell, NJ (US) 08080; Scott Wolinsky, 10 Connemara Ct., Sewell, NJ (US) 08080

( * ) Notice: Subject to any disclaimer, the term of this patent is extended or adjusted under 35 U.S.C. 154(b) by 135 days.

(21) Appl. No.: 11/126,731

(22) Filed: May 11, 2005

(65) Prior Publication Data
US 2006/0258345 A1 Nov. 16, 2006

(51) Int. Cl.
H04M 1/00 (2006.01)
A63F 9/24 (2006.01)

(52) U.S. Cl. .............. 455/575.7; 463/39; 463/43; 463/44; 455/418; 455/556.1; 343/905

(58) Field of Classification Search ........ 455/556.1, 455/575.7, 558; 463/44; 343/905
See application file for complete search history.

(56) References Cited

U.S. PATENT DOCUMENTS

| | | | | |
|---|---|---|---|---|
| 2,184,729 A | * | 12/1939 | Bailey | 343/830 |
| 5,892,661 A | * | 4/1999 | Stafford et al. | 361/737 |
| 6,138,245 A | * | 10/2000 | Son et al. | 713/400 |
| 6,292,148 B1 | * | 9/2001 | Matsuura et al. | 343/702 |
| 6,573,868 B2 | * | 6/2003 | Johnson et al. | 343/702 |
| 6,716,103 B1 | * | 4/2004 | Eck et al. | 463/45 |
| 2002/0017336 A1 | * | 2/2002 | Gass et al. | 144/2.1 |
| 2002/0019296 A1 | * | 2/2002 | Freeman et al. | 482/4 |
| 2005/0049020 A1 | * | 3/2005 | Higgins et al. | 455/575.7 |

OTHER PUBLICATIONS www.dictionary.com.*

* cited by examiner

Primary Examiner—Duc M. Nguyen
Assistant Examiner—Daniel Lai
(74) Attorney, Agent, or Firm—Volpe and Koenig, P.C.

(57) ABSTRACT

An interchangeable Gametenna used in conjunction with a wireless telephone to play a game. The Gametenna includes an antenna having at least one radiating element for receiving and transmitting wireless signals, and a memory device which is physically coupled to the radiating element by at least one non-conductive mount which electrically isolates the memory device from the radiating element. The wireless telephone includes a transceiver, a first external interface electrically coupled to the transceiver, a processor and a second external interface electrically coupled to the processor. The Gametenna expands the capabilities of the wireless telephone when connected to the first and second external interfaces. The transceiver receives and transmits wireless signals via the first external interface and the radiating element of the antenna. The processor accesses data stored in the memory device via the second external interface. The data may include instructions for playing a game.

16 Claims, 3 Drawing Sheets

GAMETENNA, INTERFACING WIRELESS TELEPHONE AND METHOD

FIELD OF THE INVENTION

The present invention relates to antennas used in conjunction with wireless telephones. More particularly, the present invention is related to an apparatus including an antenna and a memory device which stores data accessible to a processor in a wireless telephone that is used for playing a game.

BACKGROUND

The capabilities of wireless telephones continue to expand as technological advances are made and new network services are provided. However, the memory capacity and processing capabilities of current wireless telephones are limited, and software downloads may be unreliable due to the instability of the wireless medium used to transfer such downloads to the processors of these telephones. Downloading new software over the wireless medium also requires that a user follow a complex series of steps or menu instructions, which may take a significant amount of time to complete. For example, the user may have to call a customer service representative to troubleshoot, obtain authorization and facilitate payment of fees to download and activate new software.

Furthermore, access to the internal circuitry of current wireless telephones is quite limited, whereby existing compartments and panels, (e.g., used for housing a battery), are fragile. Whenever such a compartment or panel is opened, there is a considerable risk of exposing sensitive components and thus possibly damaging the wireless telephone. Additionally, these compartments and panels do not enable a user to manually interface with the processor therein to change or expand the memory capacity and processing capabilities of the wireless telephones.

Perhaps the component of a wireless telephone that is easiest to remove is its antenna. This is accomplished by simply unscrewing the base of the antenna from an external interface of the wireless telephone. Other components such as batteries or auxiliary devices, (e.g., memories and game cartridges), require that a compartment of the wireless telephone be opened.

An apparatus and interface for allowing a user to easily change the capabilities of a wireless telephone without requiring unreliable wireless downloads or obtaining internal access to the telephone is desired.

SUMMARY

The present invention provides a new external wireless telephone interface and an auxiliary memory device which allows a user to physically change the processing capabilities of the wireless telephone without having to wirelessly download software and reduce the capacity of the wireless telephone's internal memory.

An interchangeable Gametenna is used in conjunction with a wireless telephone to play a game. The Gametenna includes an antenna having at least one radiating element for receiving and transmitting wireless signals, and memory device which is physically coupled to the radiating element by at least on non-conductive mount which electrically isolates the memory device from the radiating element. The wireless telephone includes a transceiver, a first external interface electrically coupled to the transceiver, a processor and a second external interface electrically coupled to the processor. The Gametenna expands the capabilities of the wireless telephone when connected to the first and second external interfaces. The transceiver receives and transmits wireless signals via the first external interface and the radiating element of the antenna. The processor accesses data stored in the memory device via the second external interface. The data may include instructions for playing a game. The Gametenna may be exchanged with another Gametenna to play a different game. The data may be used to activate software in the wireless telephone.

The antenna may include a plurality of extendable interlocking hollow metallic cylindrical radiating elements, whereby the memory device is mounted to an inner surface of at least one of the hollow metallic cylindrical radiating elements. Alternatively, the memory device is mounted to an outer surface of the antenna.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1A:
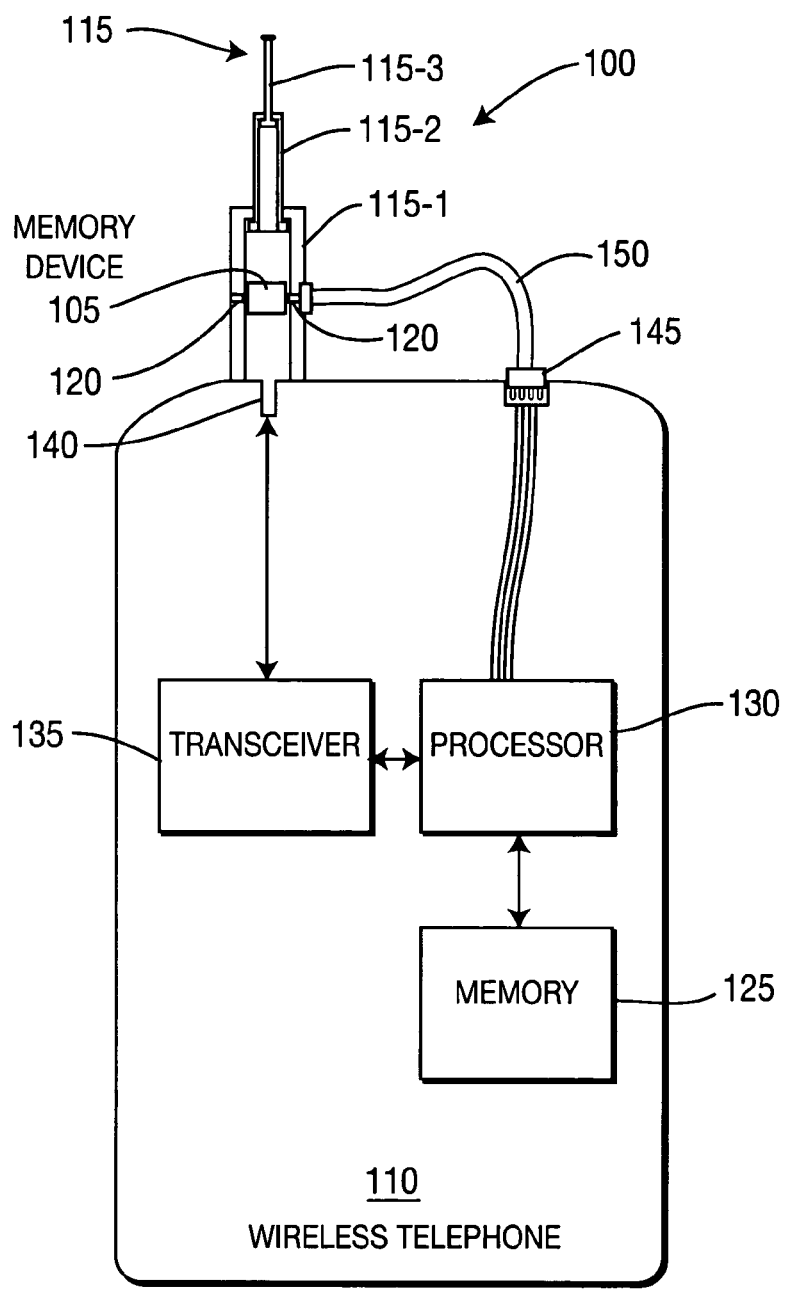
FIG. 1A shows a an interchangeable Gametenna including an antenna having at least one radiating element which interfaces with a wireless telephone via a first external interface, and a memory device which interfaces with the wireless telephone via a second external interface in accordance with one embodiment of the present invention.

The preferred embodiments will be described with reference to the drawing figures where like numerals represent like elements throughout.

Hereafter, the terminology "Gametenna" includes but is not limited to an antenna with game software incorporated therein, used for playing a game using a wireless telephone.

FIG. 1A shows an interchangeable Gametenna 100 with an internally mounted memory device 105 interfacing with a Gametenna-compatible wireless telephone 110 in accordance with the present invention. The Gametenna 100 includes an antenna 115 for receiving and transmitting wireless signals, and the memory device 105 which is physically coupled to a radiating element of the antenna 115 by one or more non-conductive mounts 120 which electrically isolate the memory device 105 from the radiating element.

In one embodiment, the memory device 105 includes data, (i.e., instructions), which are used by the wireless telephone 110 to play a game. In another embodiment, the data in the memory device 105 is used by the wireless telephone 110 to activate software stored in a memory 125 within the wireless telephone 110.

The wireless telephone further includes a processor 130, a transceiver 135, a first external interface 140 and a second external interface 145. The first external interface 140 electrically couples the antenna 115 of the Gametenna 100 to the transceiver 135 of the wireless telephone 110 for receiving and transmitting wireless signals. The second external interface 145 electrically couples the memory device 105 of the Gametenna 100 to the processor 130 of the wireless telephone 110 via a multi-wire cable 150 for providing the processor 130 with access to data stored in the memory device 105.

Figure 1B:
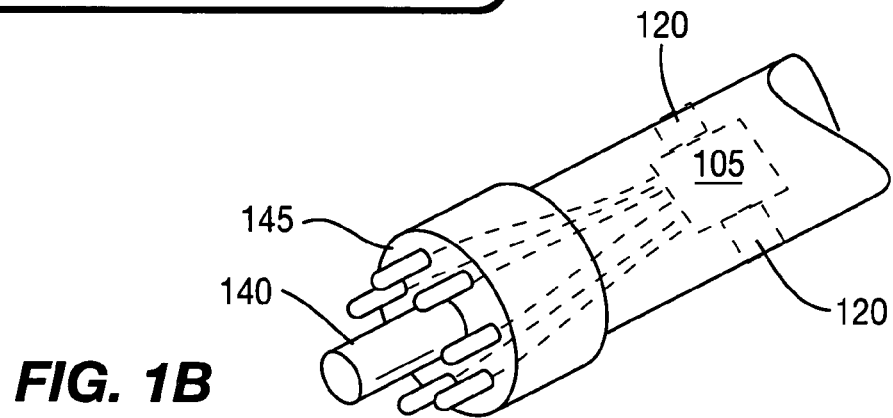
FIG. 1B shows the base of a Gametenna configured with an antenna interface circumvented by a memory device interface in accordance with another embodiment of the present invention.

In another embodiment, FIG. 1B shows the base of a Gametenna that does not require the multi-wire cable 150, whereby the interface for the antenna 115 is circumvented by the interface for the memory device 105.

As shown in FIG. 1A, the antenna 115 of the Gametenna 100 may include a plurality of extendable interlocking hollow metallic cylindrical radiating elements 115-1, 115-2, 115-3, and the memory device 105 is mounted inside at least one of the hollow metallic cylindrical radiating elements 115-1, 115-2 and 115-3. Preferably, the memory device 105 is mounted to an inner surface of the widest hollow metallic cylindrical radiating element 115-1 at the base of the antenna 115.

Figure 2:
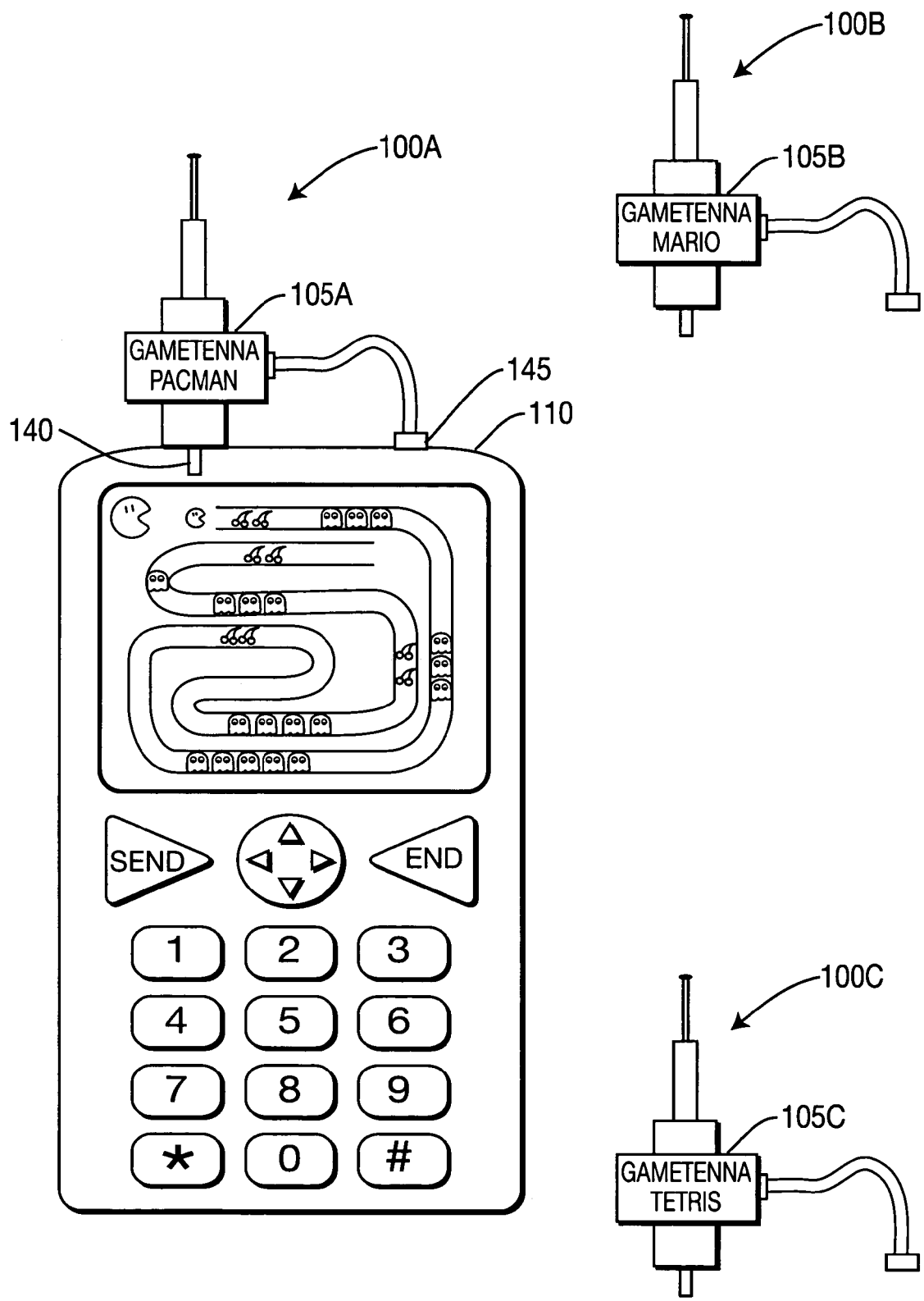
FIG. 2 shows a Gametenna that is currently interfacing with a wireless telephone to play a game, and also shows additional Gametennas that are available to play different games, in accordance with the present invention.

FIG. 2 shows a Gametenna 100A used for playing PAC-MAN with an externally mounted memory device 105A interfacing with a wireless telephone 110, and also shows additional Gametennas 100B and 100C that are available to play different games, (e.g., MARIO and TETRIS), based on data stored in their respective memory devices 105B and 105C.

Figure 3:
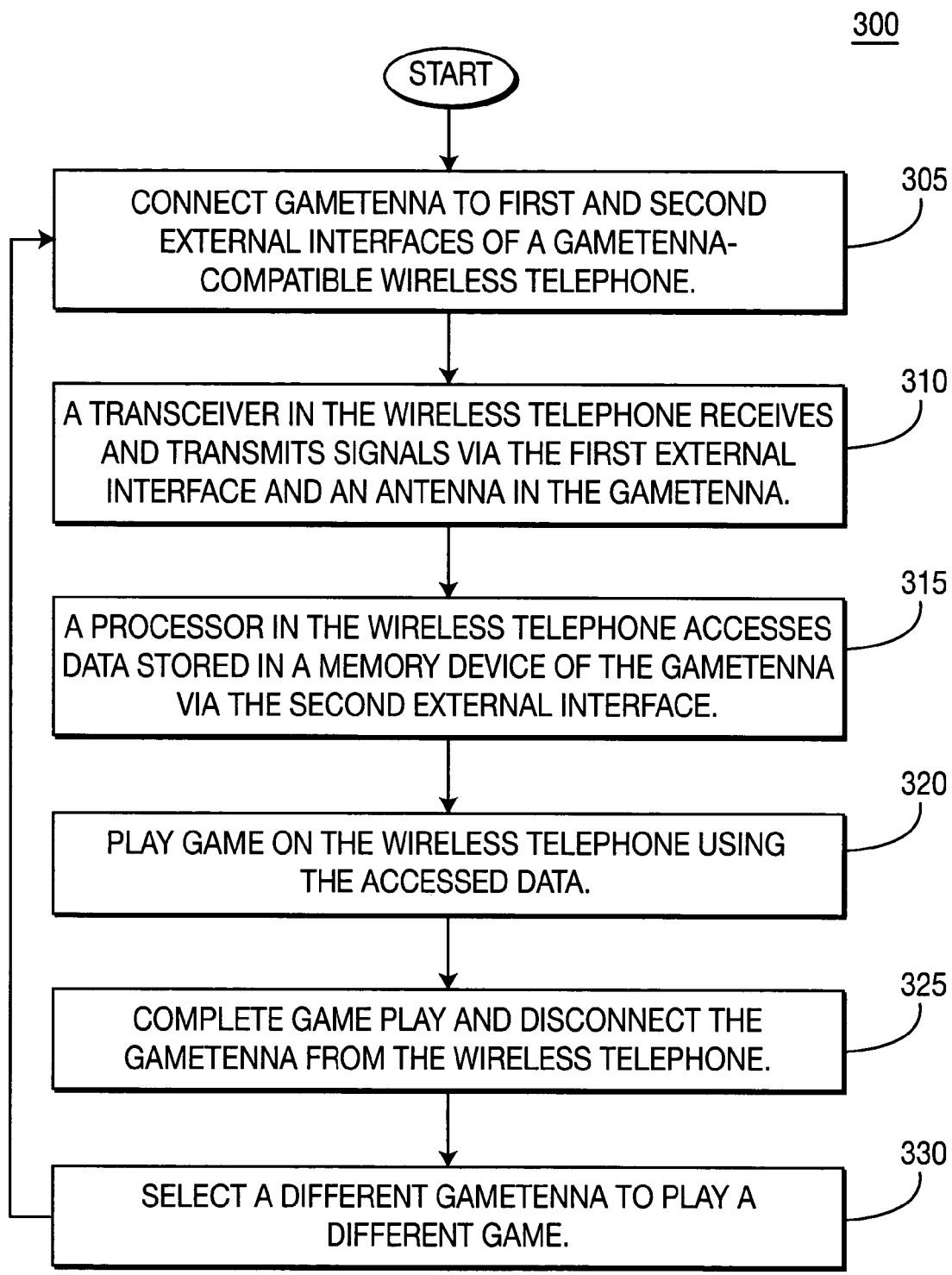
FIG. 3 is a flowchart of a process including method steps for using different Gametennas to play different games using a wireless telephone in accordance with the present invention.

FIG. 3 is a flowchart of a process 300 including method steps for using different Gametennas to play different games using a wireless telephone in accordance with the present invention. Referring to FIGS. 2 and 3, a Gametenna 100A is connected to a first external interface 140 and a second external interface 145 of a Gametenna-compatible wireless telephone 110 (step 305). In step 310, a transceiver 135 in the wireless telephone 110 receives and transmits signals via the first external interface 140 and an antenna 115 in the Gametenna 100A. In step 315, a processor 130 in the wireless telephone 110 access data stored in a memory device 105A of the Gametenna 100A via a second external interface 145. In step 320, a game, (e.g., PACMAN), is played on the wireless telephone 110 using the accessed data. In step 325, game play is completed and the Gametenna 100A is disconnected from the wireless telephone 110. In step 330, a different Gametenna 100B or 100C is selected to play a different game. The process 300 then returns to step 305 whereby the different Gametenna 10B or 100C is connected to the first and second external interfaces 140, 145 of the wireless telephone 100.

While the present invention has been described in terms of the preferred embodiment, other variations which are within the scope of the invention as outlined in the claims below will be apparent to those skilled in the art.

What is claimed is:

1. A Gametenna comprising:
   (a) an antenna having at least one hollow cylindrical radiating element for receiving and transmitting wireless signals; and
   (b) a memory device for storing data used to play a game, the memory device being physically coupled to an inner surface of the hollow cylindrical radiating element by at least one non-conductive mount that electrically isolates the memory device from the hollow cylindrical radiating element.

2. The Gametenna of claim 1 wherein the data is used by a wireless telephone coupled to the Gametenna to activate software stored in a memory within the wireless telephone.

3. The Gametenna of claim 1 wherein the Gametenna is electrically coupled to a wireless telephone having a transceiver and a processor, the Gametenna further comprising:
   (c) a first interface for electrically coupling the hollow cylindrical radiating element of the antenna to the transceiver of the wireless telephone for receiving and transmitting the wireless signals; and
   (d) a second interface for electrically coupling the memory device to the processor of the wireless telephone for providing the processor with access to the data stored in the memory device.

4. The Gametenna of claim 3 wherein the first interface is circumvented by the second interface.

5. The Gametenna of claim 1 wherein the antenna comprises a plurality of extendable interlocking hollow metallic cylindrical radiating elements and the non-conductive mount is used to physically couple the memory device to an inner surface of at least one of the hollow metallic cylindrical radiating elements.

6. A method of selecting and playing different games using a wireless telephone, the method comprising:
   (a) connecting a first Gametenna to the wireless telephone, the first Gametenna comprising a first antenna and a first memory device, wherein the first antenna has a first radiating element for receiving and transmitting wireless signals, and the first memory device is physically coupled to the first radiating element by at least one non-conductive mount that electrically isolates the first memory device from the first radiating element;
   (b) playing a first game using the wireless telephone by accessing game instructions stored in the first memory device of the first Gametenna;
   (c) disconnecting the first Gametenna from the wireless telephone;
   (d) selecting a second Gametenna to play a second game using the wireless telephone, the second Gametenna comprising a second antenna and a second memory device, wherein the second antenna has a second radiating element for receiving and transmitting wireless signals, and the second memory device is physically coupled to the second radiating element by at least one non-conductive mount that electrically isolates the second memory device from the second radiating element;
   (e) connecting the second Gametenna to the wireless telephone; and
   (f) playing the second game using the wireless telephone by accessing game instructions stored in the second memory device of the second Gametenna.

7. The method of claim 6 wherein step (e) comprises:
   (e1) electrically coupling the second antenna of the second Gametenna to a transceiver interface of the wireless telephone; and
   (e2) electrically coupling the second memory device of the second Gametenna to a processor interface of the wireless telephone.

8. The method of claim 7 wherein step (c) comprises:
   (c1) disconnecting the first antenna of the first Gametenna from the transceiver interface of the wireless telephone; and
   (c2) disconnecting the first memory device of the first Gametenna from the processor interface of the wireless telephone.

9. Apparatus for playing different games comprising:
(a) a wireless telephone including:
 (a1) a transceiver;
 (a2) a first external interface electrically coupled to the transceiver;
 (a3) a processor; and
 (a4) a second external interface electrically coupled to the processor; and
(b) at least one interchangeable Gametenna used by a user of the wireless telephone to play a particular game, the Gametenna comprising:
 (b1) an antenna having at least one radiating element that is electrically coupled to the first external interface for receiving and transmitting wireless signals; and
 (b2) a memory device for storing data, wherein the memory device is physically coupled to the radiating element by at least one non-conductive mount that electrically isolates the memory device from the radiating element, and the memory device is electrically coupled to the second external interface.

10. The apparatus of claim 9 wherein the data includes instructions that are used by the processor of the wireless telephone to play a game.

11. The apparatus of claim 9 wherein the antenna comprises a plurality of extendable interlocking hollow metallic cylindrical radiating elements, and the non-conductive mount is used to physically couple the memory device to an inner surface of at least one of the hollow metallic cylindrical radiating elements.

12. The apparatus of claim 9 wherein the non-conductive mount is used to physically couple the memory device to an outer surface of the radiating element.

13. The apparatus of claim 9 wherein the second interface electrically couples the memory device to the processor of the wireless telephone for providing the processor with access to the data stored in the memory device.

14. The apparatus of claim 9 further comprising:
a memory electrically coupled to the processor for storing software.

15. The apparatus of claim 14 wherein the data is used by the wireless telephone to activate the software.

16. A Gametenna that is detachably coupled to a wireless telephone having a transceiver and a processor, the Gametenna comprising:
(a) an antenna having at least one cylindrical radiating element for receiving and transmitting wireless signals;
(b) a memory device for storing data used to play a game, the memory device being physically coupled to the cylindrical radiating element by at least one non-conductive mount that electrically isolates the memory device from the cylindrical radiating element;
(c) a first interface for electrically coupling the cylindrical radiating element of the antenna to the transceiver of the wireless telephone for receiving and transmitting the wireless signals; and
(d) a second interface for electrically coupling the memory device to the processor of the wireless telephone for providing the processor with access to the data stored in the memory device, wherein the first interface is circumvented by the second interface.

* * * * *